US011093743B2

(12) United States Patent
Keen et al.

(10) Patent No.: US 11,093,743 B2
(45) Date of Patent: Aug. 17, 2021

(54) INTELLIGENT PERSONALIZATION OF OPERATIONS OF AN IMAGE CAPTURING DEVICE

(71) Applicant: INTERNATIONAL BUSINESS MACHINES CORPORATION, Armonk, NY (US)

(72) Inventors: Martin G. Keen, Cary, NC (US); Martin Presler-Marshall, Chapel Hill, NC (US); Ravi Ranjan, Apex, NC (US); Grant Mericle, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 16/101,146

(22) Filed: Aug. 10, 2018

(65) Prior Publication Data
US 2020/0050898 A1    Feb. 13, 2020

(51) Int. Cl.
*G06K 9/00* (2006.01)
*G06K 9/62* (2006.01)
*G06K 9/78* (2006.01)
*G06N 20/00* (2019.01)
*H04N 5/232* (2006.01)

(52) U.S. Cl.
CPC ....... *G06K 9/00624* (2013.01); *G06K 9/6202* (2013.01); *G06K 9/623* (2013.01); *G06K 9/6267* (2013.01); *G06K 9/78* (2013.01); *G06N 20/00* (2019.01); *H04N 5/23218* (2018.08)

(58) Field of Classification Search
CPC .......... G06K 9/20–348; G06K 9/6267; G06K 9/623; G06K 9/78; G06K 9/6202; G06K 9/00624; H04N 5/23218–23219; G06N 20/00
See application file for complete search history.

(56) References Cited

U.S. PATENT DOCUMENTS

| | | | |
|---|---|---|---|
| 5,227,835 A | 7/1993 | Anagnostopoulos | |
| 6,301,440 B1 | 10/2001 | Bolle et al. | |
| 7,714,898 B2 | 5/2010 | Pilu | |
| 9,826,149 B2 | 11/2017 | Chalom et al. | |
| 2005/0012830 A1 | 1/2005 | Pilu | |
| 2009/0284621 A1 | 11/2009 | Oks et al. | |
| 2009/0295945 A1* | 12/2009 | Watanabe | H04N 5/23219 348/231.99 |
| 2012/0019687 A1 | 1/2012 | Razavi et al. | |
| 2013/0169853 A1* | 7/2013 | Luong | H04N 5/23206 348/345 |
| 2013/0293735 A1 | 11/2013 | Suzaki | |
| 2017/0140285 A1* | 5/2017 | Dotan-Cohen | G06Q 10/04 |
| 2019/0379837 A1* | 12/2019 | Kim | H04N 9/735 |

* cited by examiner

*Primary Examiner* — Casey L Kretzer
(74) *Attorney, Agent, or Firm* — Griffiths & Seaton PLLC (57) ABSTRACT

Embodiments for personalizing operations of an image capturing device by a processor. A combination of one or more objects and features along with associated settings of the image capturing device captured in an image may be classified. One or more personalized patterns of the settings of the image capturing device may be determined according to the classifying. The one or more personalized patterns of the settings of the image capturing device may be applied for capturing a subsequent image.

17 Claims, 7 Drawing Sheets

INTELLIGENT PERSONALIZATION OF OPERATIONS OF AN IMAGE CAPTURING DEVICE

BACKGROUND OF THE INVENTION

Field of the Invention

The present invention relates in general to computing systems, and more particularly to, various embodiments for personalizing operations of an image capturing device using a computing processor.

Description of the Related Art

In today's society, consumers, businesspersons, educators, and others use various images (e.g., photographs and video) with increasing frequency in a variety of settings. With the proliferation of images has also come various ways to accommodate the increasing amount of digital information corresponding to the images. For example, many photographs are now stored in large databases within and between distributed computing components, where individuals can access the images on a number of devices (e.g., computers, handheld devices, phones, tablets, and the like). In addition to the images being more readily accessible, the images are also sharable between individuals, such as by allowing access or sharing through social media scenarios.

SUMMARY OF THE INVENTION

Various embodiments for personalizing operations of an image capturing device by a processor, are provided. In one embodiment, by way of example only, a method for personalizing operations of an image capturing device, again by a processor, is provided. A combination of one or more objects and features along with associated settings of the image capturing device captured in an image may be classified. One or more personalized patterns of the settings of the image capturing device may be determined according to the classifying. The one or more personalized patterns of the settings of the image capturing device may be applied for capturing a subsequent image.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously indicated, technology for digital data representative of images (e.g., video or photos) is rapidly increasing. Data is increasingly processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

With the proliferation and management of photos and their associated digital information, a need exists for enabling users to better manage their own personal photographs and camera settings. Very often, dedicated cameras and mobile devices, with embedded cameras, present the user with many options and settings for photograph and video capture. Moreover, a user may desire to continuously apply and use various setting according to one or more different features, characteristics, objects, or places user for photograph and video capture.

Accordingly, various embodiments described herein provide a solution for automatically applying personalized camera settings based on cognitive analysis. The present invention provides for classifying features, people, places, objects, and movement as a user prepares to capture a photograph or video and compares these classifications to one or more derived personalized patterns of camera setting usage. The camera settings most appropriate to prior preferences of a user may be applied.

In an additional aspect, a combination of one or more objects and features (which may include people, places, and movement) along with associated settings of the image capturing device captured in an image may be classified. One or more personalized patterns of the settings of the image capturing device may be determined according to the classifying. The one or more personalized patterns of the settings of the image capturing device may be applied for capturing a subsequent image.

In one aspect, "cognitive" may include or refer to artificial intelligence ("AI"), deep neural networks, and deep learning. In other words, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
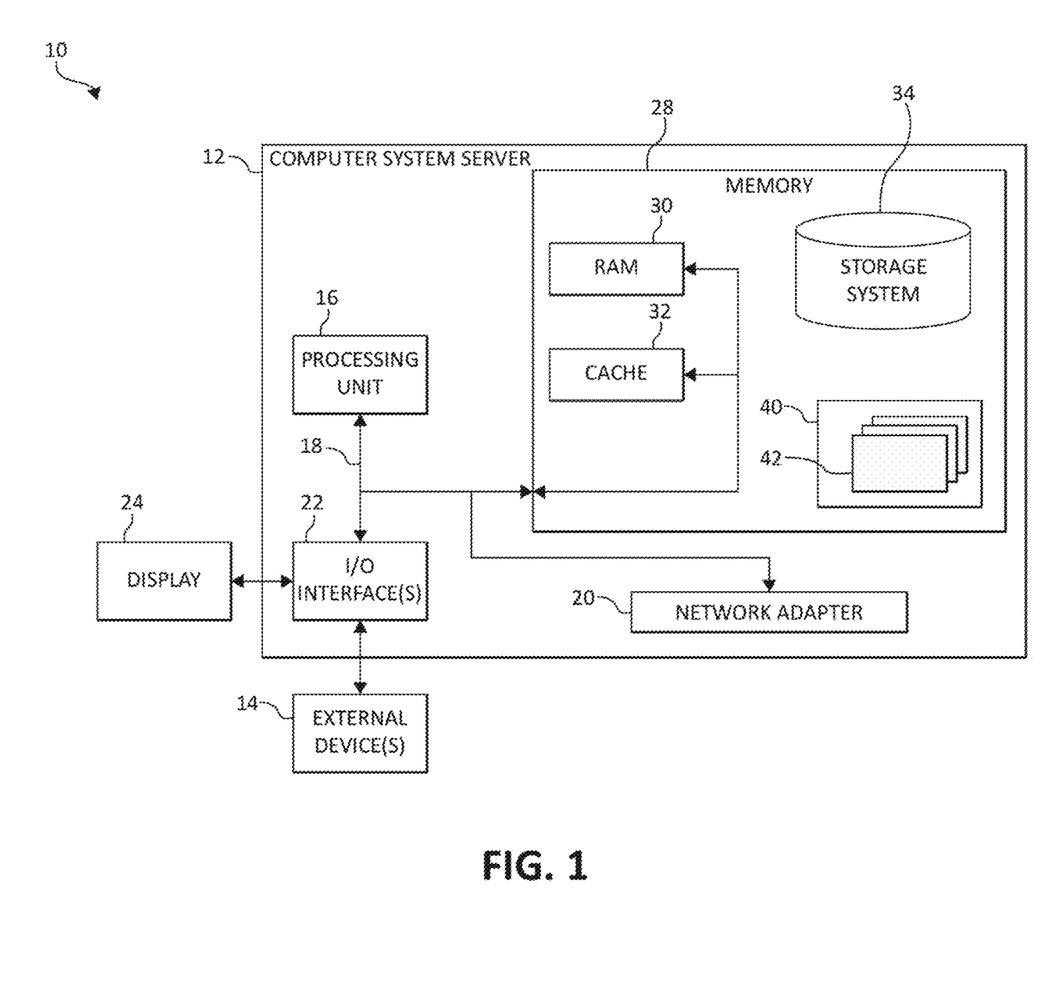
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
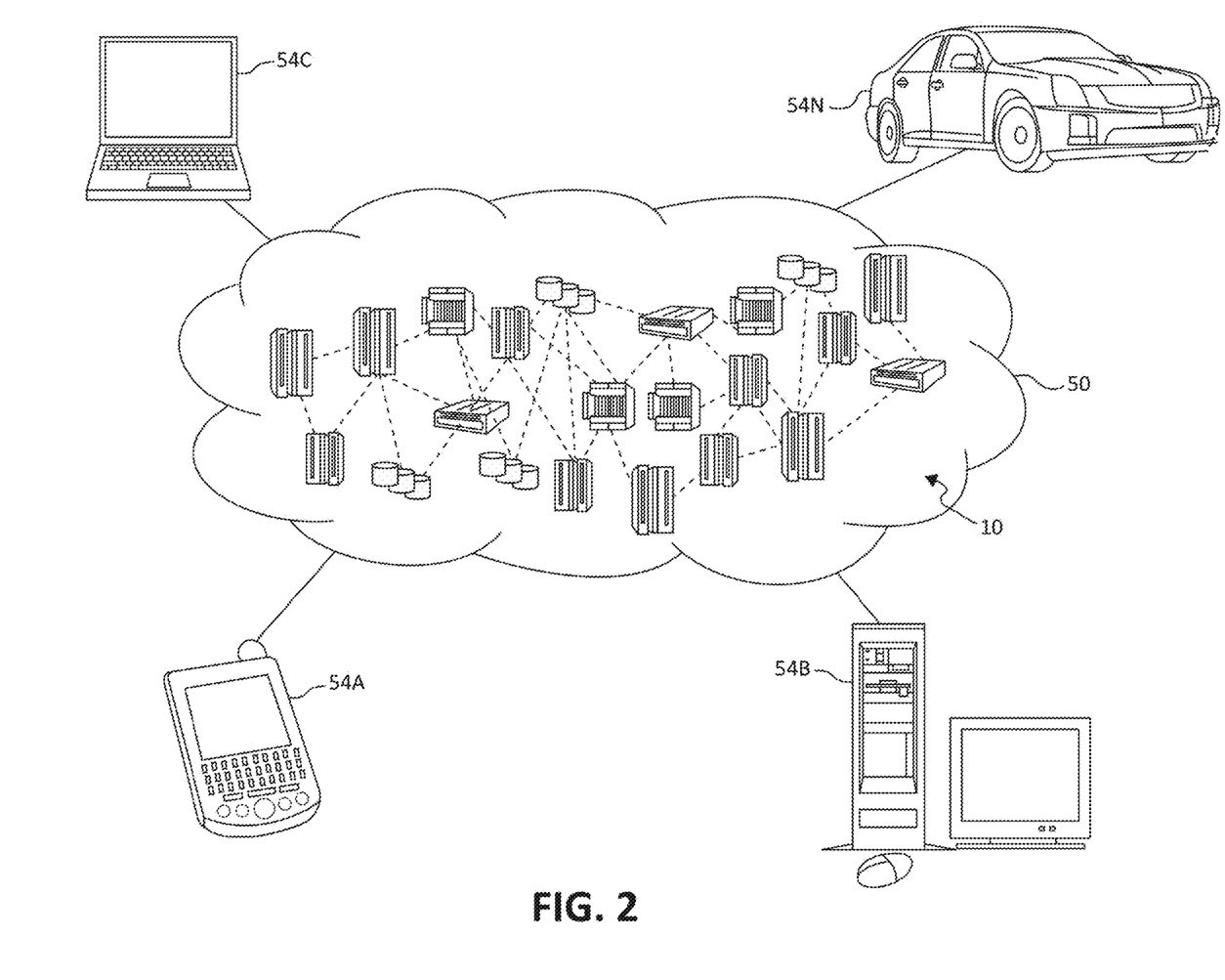
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
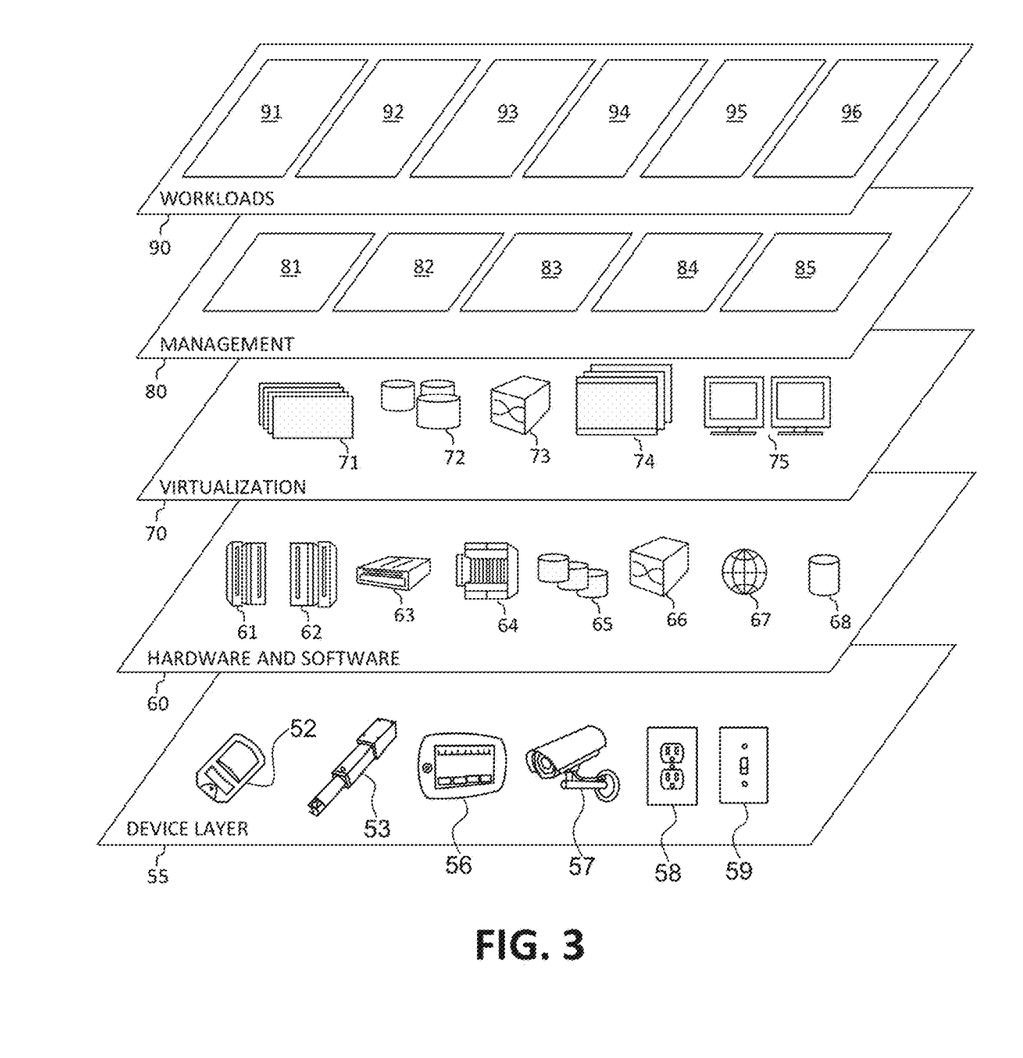
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent personalization of operations of an image capturing device. In addition, workloads and functions 96 for intelligent personalization of operations of an image capturing device may include such operations as data analytics, data analysis, and as will be further described, notification functionality. One of ordinary skill in the art will appreciate that the workloads and functions 96 for intelligent personalization of operations of an image capturing device may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the intelligent personalization of operations of an image capturing device by classifying people, places, objects, and movement as they are captured by a camera device, noting the camera settings that were used at the time of capture, and applying those setting. The combination of classifications and camera settings are analyzed to derive personalized patterns of camera setting usage. As a user prepares to take a new photo or video, the objects, places, and people in the camera view (e.g., camera "shot"), the classifications may be compared to derived personalized patterns of camera setting usage, and the relevant camera settings may be automatically applied for capturing the photograph and/or video. Said differently, a combination of one or more objects and features along with associated settings of the image capturing device captured in an image may be classified. One or more personalized patterns of the settings of the image capturing device may be determined according to the classifying. The one or more personalized patterns of the settings of the image capturing device may be applied for capturing a subsequent image.

Figure 4:
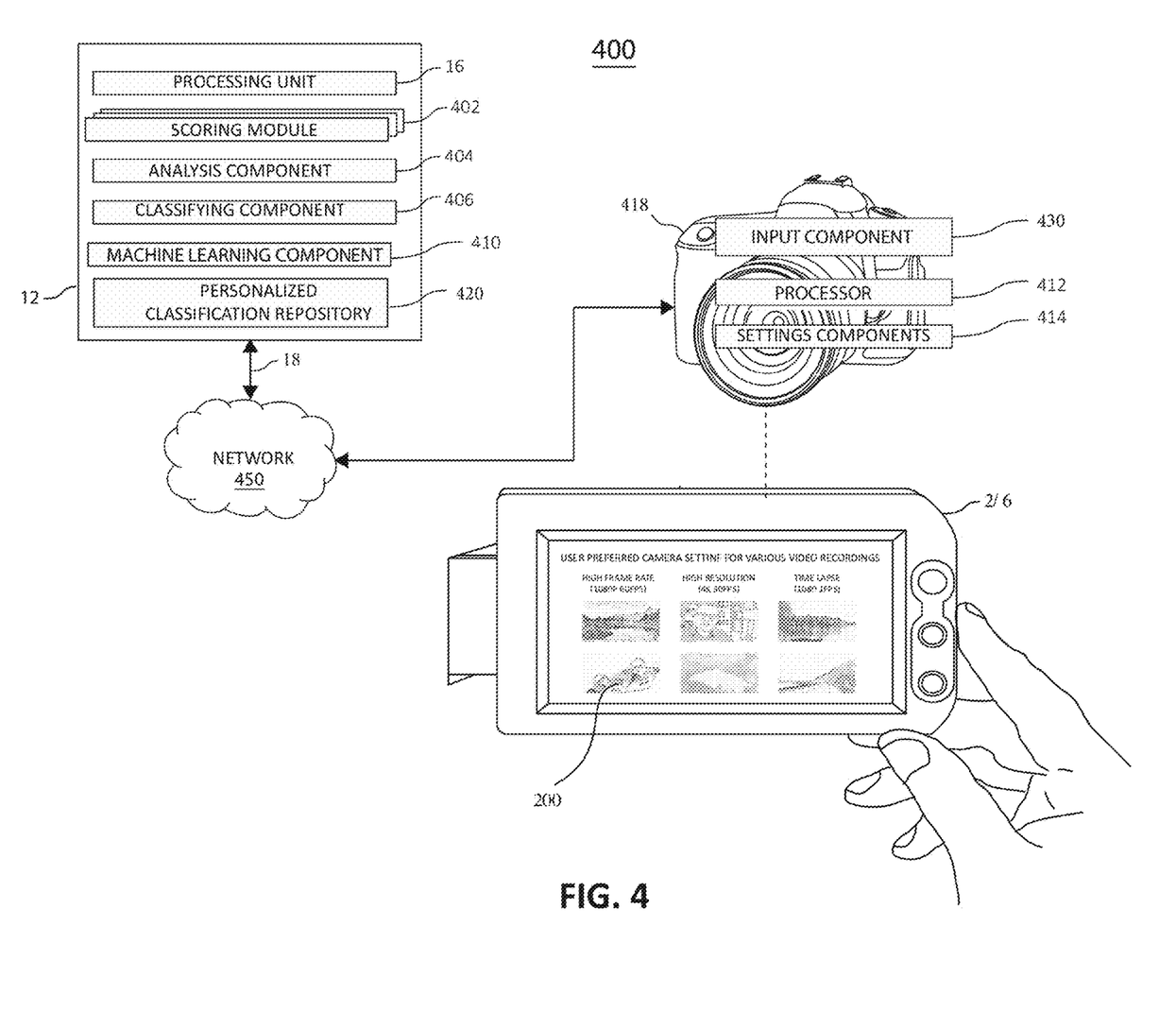
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. Computer system/server 12 is again shown, incorporating processing unit 16 to perform various computational, data processing and other functionality in accordance with various aspects of the present invention. A database of a personalized classification repository 420 is shown, along with a scoring component 402, an analysis component 404, a classifying component 406, a visual classification component 408, a machine learning component 410.

As one of ordinary skill in the art will appreciate, the depiction of the various functional units in computer system/server 12 is for purposes of illustration, as the functional units may be located within computer system/server 12 or elsewhere within and/or between distributed computing components.

FIG. 4's components 400 as shown may include a number of image recording devices, including a camera 418 ("still" or video). The camera 418 is connected via communications channels (e.g., bus 18) through the network to the computer system/server 12 as shown. In one exemplary embodiment, a user may find themselves in a location where they desire to take a photo. The camera 418 of the user may have already located, and connected to, a wireless network 450. The camera 418 may then connect through the wireless network 450 (e.g., via the Internet) to the computer system/server 12.

Camera 418 may incorporate additional functional components 400 such as the depicted input component 430, processor 412, and settings component 414. Here again, the use of an input component 430 and settings component 414 is merely for illustrative convenience as a variety of functional components 400 may be integrated into the camera 418 to accomplish specific functionality to further the mechanisms of the illustrated embodiments.

Input component 430 may, in one embodiment, serve to receive image information provided by the camera 418. For example, once the user snaps a candidate image, the input component 430 may assist in identifying one or more features, objects, and/or characteristics (e.g., people, environments, places, structures, or other physical properties) to be provided to the computer system/server 12. The features, objects, and characteristics may also be provided through the input component 430 by a user's own input, or by other devices, such as Global Positioning System (GPS) sensor devices to indicate location, or by connecting to the light meter in the user's camera 418 to determine the current lighting. A variety of input data may pass through the input component 430 to be processed by the computer system/server 12.

In similar fashion, the settings component 414 may function as an output module for the cameras 418, so for example, when the computer system/server 12 provides instructions/setting recommendations/other data to the user's camera 418. The settings component 414 may implement setting changes as a background process, or the settings component 414 may query the user, in one embodiment, whether they wish to change one or more settings, location, lighting, and other configurations on camera 418. This functionality is illustrated by example with the graphical user interface (GUI) 422, which provides information from the computer system/server 12, or receives input and/or selection data from the user.

A user may use camera 418 to record a video and/or capture photograph, for example, in one of three settings: 1) high frame rate (e.g., 1080p resolution at 60 frames per second and a high frame rate enables the user to create slow motion footage in video editing), 2) high resolution (e.g., 4K resolution at 30 frames per second and a higher resolution enables a user to crop portions of footage without losing clarity), and/or 3) time lapse setting that captures a frame every second to speed up footage. The user may select the video recording/photograph capture mode based on how the user intends to use the footage.

The personalized classification repository 420 may include a data repository of personalized patterns of the settings of the image capturing device obtained from classifying from previously obtained images and/or images currently undergoing a visual classification operation. The images themselves may also be stored in a corresponding database, which is not shown for purposes of illustrative convenience.

Analysis component 404 and classifying component 406 may work in concert with processing unit 16 to accomplish various aspects of the present invention. For example, analysis component 404 may undergo various data analytics functions associated with the personalized classification repository 420 to find best fitting personalized classification settings associated with previously stored images. The classifying component 406 may make decisions in conjunction with the analysis component 404 to classify a combination of one or more objects and features along with associated settings of the image capturing device captured in an image. In another embodiment, objects and features may be analyzed gleaned from one previously obtained image or from a number of images currently undergoing a visual classification operation.

As one of ordinary skill in the art will appreciate, the analysis component 404 and the classifying component 406 may implement mathematical modeling, image processing, or other data processing technologies to carry out the various mechanisms of the illustrated embodiments. The classifying component 406 may determine one or more personalized patterns of the settings of the image capturing device according to the classifying. The classifying component 406 may apply one or more personalized patterns of the settings of the image capturing device for capturing a subsequent image.

The scoring component 402 may assign a confidence score for each of the one or more personalized patterns according a data used to generate the one or more personalized patterns. The scoring component 402 may rank each of the one or more personalized patterns according to a frequency of occurrence in a plurality of images.

In short, the analysis component 404 may analyze an image each time a user takes a picture or video to is captured. The classifying component 406 may classify what is present (e.g., features, objects, characteristics, movements, places, a variety of physical properties, etc.) in the video/photograph and which camera settings were used. The classifying component 406 may predict the appropriate camera settings to use based on a subsequent image based on analysis of which settings a user selected in situations with similar image classifications.

Figure 5A:
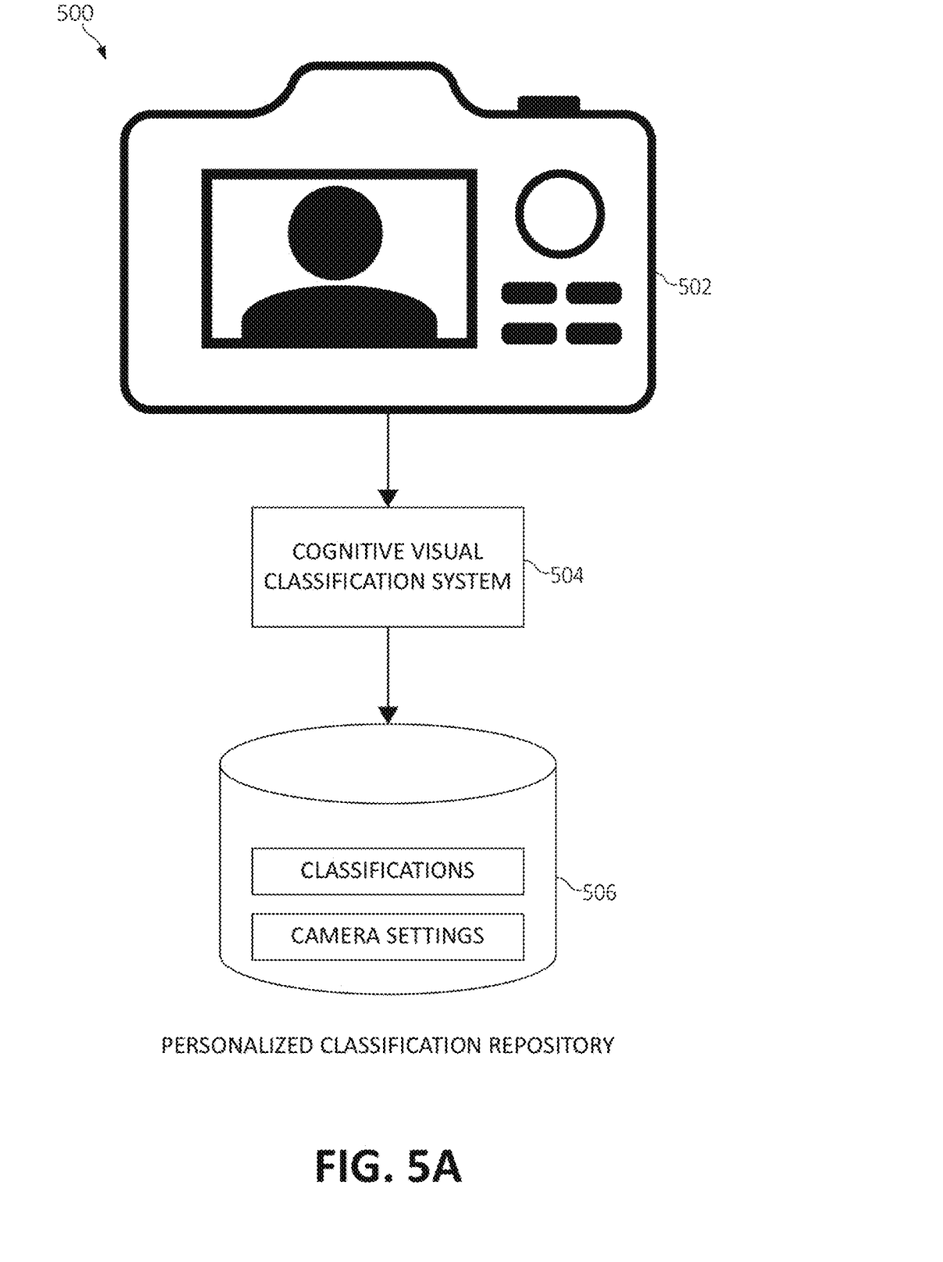
FIG. 5A is an additional block diagram depicting an exemplary operation of classifying and associating contents of an image with applied camera settings in which aspects of the present invention may be realized.
Figure 5B:
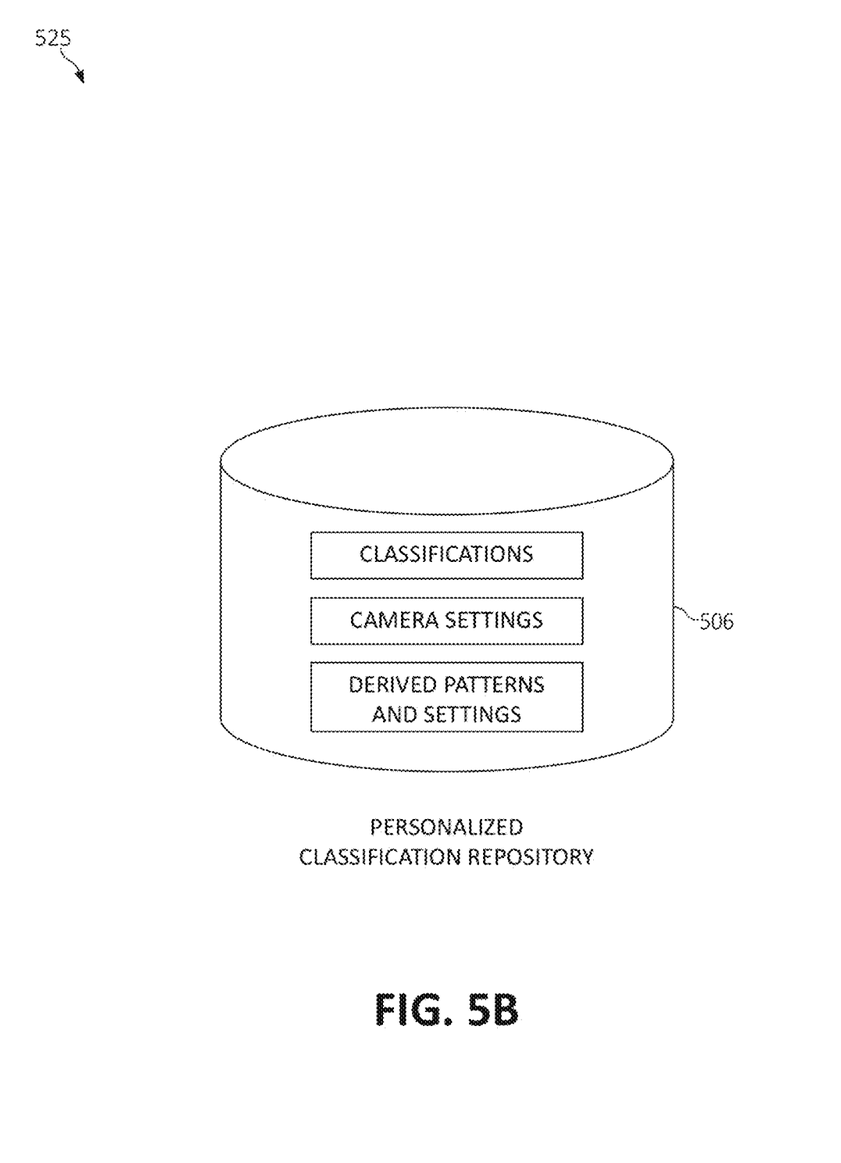
FIG. 5B is an additional block diagram depicting an exemplary implementation of a personalized classification repository which aspects of the present invention may be realized.

Turning now to FIGS. 5A-5B, a block diagram of exemplary implementation of a personalized classification repository for intelligent personalization of operations of camera settings and of classifying and associating contents of an image with applied camera settings. As shown, the various blocks of functionality are depicted with arrows designating the blocks' 500, 525 relationships with each other and to show process flow. Additionally, descriptive information is also seen relating each of the functional blocks 500, 525. As will be seen, many of the functional blocks may also be considered "modules" of functionality, in the same descriptive sense as has been previously described in FIG. 4. With the foregoing in mind, the module blocks 500, 525 may also be incorporated into various hardware and software components of a system for in accordance with the present invention. Many of the functional blocks 500 may execute as background processes on various components, either in distributed computing components, or on the user device, or elsewhere, and generally unaware to the user.

As illustrated in FIGS. 5A-5B, the mechanisms of the illustrated embodiment may be performed in three stages.
Stage 1: System Classifies Each Photograph and/or Video Taken by a User.

Starting in block 502, a user may capture a photograph and/or video using a camera device (e.g., a still camera, or a camera embedded into another device such as a smart phone or tablet). The captured photograph and/or video may be sent to a cognitive system for visual analysis using one or more AI services, as in block 504. These AI services may include, without limitation, instances of IBM® Watson® such as Watson® Visual Recognition. (IBM® and Watson® are trademarks of International Business Machines Corporation.). The visual analysis application may identify one or more classifications including, for example, facial recognition, people, age ranges (e.g., estimated ages), gender, objects, locations (e.g., outdoors, indoors, office environment, home, etc.). These classifications may be stored in a personalized classification repository along with various camera settings that a user may have manually selected when taking the photograph/video, as in block 506.
Stage 2: Cognitive Analysis of Personalized Classification Repository The personalized classification repository may be analyzed to derive personalized patterns on which camera settings are typically applied when particular classifications appear in a photograph/video such as, for example, the personalized patterns that apply to user A when taking videos, as illustrated in FIG. 4. For example, the various personalized patterns may include a user capturing fast moving objects and scenes with a high frame rate (e.g., a train or car traveling at a high speed). The user may capture talking-head style videos with a high resolution. The user may capture videos featuring a primary object of interest that fills less than 20% of the frame in high resolution (e.g., a shipwreck in the distance). The user may capture very low levels of motion using time lapse mode (e.g., the sun moving in the sky). The user may capture passing scenery using time lapse mode (e.g., driving on a scenic road or overlooking a scenic destination).

Each derived personalized pattern may be assigned a confidence level (e.g., a confidence score) based on the strength of the data used to generate the derived personalized pattern. Personalized patterns that occur more frequently across many photos/videos may be assigned weighted values ranked higher (e.g., derived, higher weights) than those personalized patterns that occur in fewer photos/videos. These weighted values and confidence levels are also stored in the personalized classification repository, as illustrated in block 506. Additionally, the user can supplement the derived weighted higher by providing a user's own classifications and own images to train the cognitive system.

Stage 3: Application of Automated Camera Settings for New Photograph/Video.

A user may prepare to take a new picture of video and frame up the image shot in the viewfinder. The cognitive visual classification operation (described in Stage 1) may classify the features, characteristics, objects, places, movements, and/or people in the captured image. The classifications are compared to the personalized classification repository to derive if the classifications match any of the personalized derived patterns and settings. If a match is located having a confidence level above a threshold level, the camera settings associated with that personalized pattern are automatically applied such as, for example, changing a video mode to high frame rate. This automated selection of camera settings can be applied with existing automated modes on a camera such as, for example, automatic exposure and focus.

Thus, various features, objects, characteristics, configurations, or other physical properties (e.g., people, places, objects, and movement) may be captured by a camera device, while identifying and classifying the camera settings that were used at the time of image capture. This combination of classifications and camera settings may be analyzed to derive personalized patterns of camera setting usage. As a user prepares to capture a new photograph/video, the objects, places, and people in the shot may be classified and these classifications may also be analyzed to derived personalized patterns of camera setting usage, and automatically applies the relevant camera settings for the new video/photograph shot.

Figure 6:
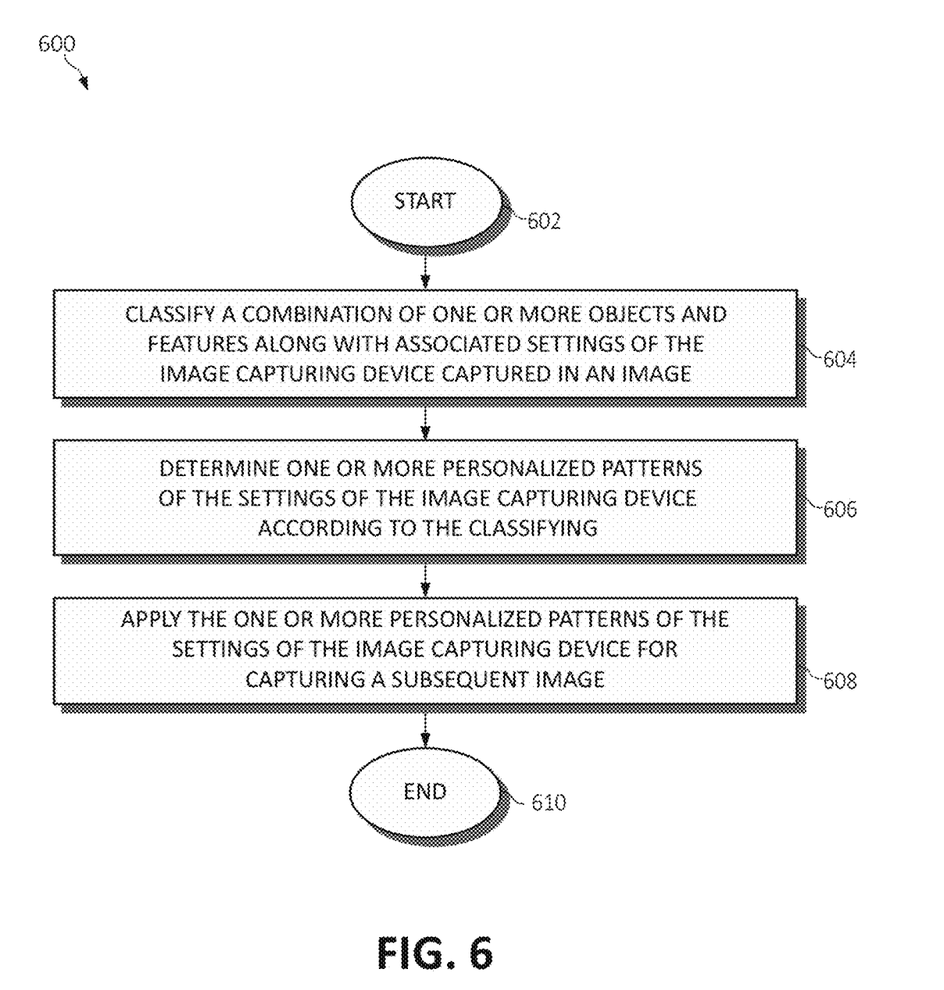
FIG. 6 is a flow chart diagram depicting an exemplary method for personalizing operations of an image capturing device by a processor, again in which aspects of the present invention may be realized.

Turning now to FIG. 6, a method 600 for personalizing operations of an image capturing device in an Internet of Things (IoT) computing environment is depicted, in which various aspects of the illustrated embodiments may be implemented. The functionality 600 may be implemented as a method executed as instructions on a machine, where the instructions are included on at least one computer readable medium or on a non-transitory machine-readable storage medium. The functionality 600 may start in block 602.

A combination of one or more objects and features along with associated settings of the image capturing device captured in an image may be classified, as in block 604. One or more personalized patterns of the settings of the image capturing device may be determined according to the classifying, as in block 606. The one or more personalized patterns of the settings of the image capturing device may be applied for capturing a subsequent image, as in block 608. The functionality 600 may end in block 610.

In one aspect, in conjunction with and/or as part of at least one block of FIG. 6, the operations of method 600 may include each of the following. The operations of method 600 may assign a confidence score for each of the one or more personalized patterns according a data used to generate the one or more personalized patterns. Each of the one or more personalized patterns may be ranked according to a frequency of occurrence in a plurality of images.

The operations of method 600 may classify one or more objects and features associated with the subsequent image during a visualization operation for capturing the subsequent image, and match the classification of the one or more objects and features for the subsequent image with the one or more personalized patterns having a confidence score above a selected threshold. The operations of method 600 may apply the one or more personalized patterns of the settings of the image capturing device with existing automated settings of the image capturing device for capturing the subsequent image. A machine learning mechanism may be implemented for learning the one or more personalized patterns of the settings of the image capturing device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for personalizing operations of an image capturing device, comprising:

classifying a combination of one or more objects and features along with associated settings of the image capturing device captured in an image;

determining one or more personalized patterns of the settings of the image capturing device according to the classifying, wherein the personalized patterns are indicative of user preferences learned according to historical images captured under a particular context;

assigning a confidence score to each of the one or more personalized patterns according to a strength of data used to generate the one or more personalized patterns;

responsive to the image capturing device framing a preview of a subsequent image yet prior to a capture of the subsequent image, determining whether the preview is inclusive of image information related to the classifying; and responsive to determining the image information is related to the classifying and the confidence score of the one or more personalized patterns surpasses a selected threshold, applying the one or more personalized patterns of the settings of the image capturing device prior to capturing the subsequent image.

2. The method of claim 1, further including ranking each of the one or more personalized patterns according to a frequency of occurrence in a plurality of images.

3. The method of claim 1, further including classifying one or more objects and features associated with the subsequent image during a visualization operation for capturing the subsequent image.

4. The method of claim 3, further including matching the classification of the one or more objects and features for the subsequent image with the one or more personalized patterns whose confidence score surpasses the selected threshold.

5. The method of claim 1, further including applying the one or more personalized patterns of the settings of the image capturing device with existing automated settings of the image capturing device for capturing the subsequent image.

6. The method of claim 1, further including initiating a machine learning mechanism for learning the one or more personalized patterns of the settings of the image capturing device.

7. A system for personalizing operations of an image capturing device in an Internet of Things (IoT) computing environment, comprising:

one or more computers with executable instructions that when executed cause the system to:

classify a combination of one or more objects and features along with associated settings of the image capturing device captured in an image;

determine one or more personalized patterns of the settings of the image capturing device according to the classifying, wherein the personalized patterns are indicative of user preferences learned according to historical images captured under a particular context;

assign a confidence score to each of the one or more personalized patterns according to a strength of data used to generate the one or more personalized patterns;

responsive to the image capturing device framing a preview of a subsequent image yet prior to a capture of the subsequent image, determine whether the preview is inclusive of image information related to the classifying; and responsive to determining the image information is related to the classifying and the confidence score of the one or more personalized patterns surpasses a selected threshold, apply the one or more personalized patterns of the settings of the image capturing device prior to capturing the subsequent image.

8. The system of claim 7, wherein the executable instructions further rank each of the one or more personalized patterns according to a frequency of occurrence in a plurality of images.

9. The system of claim 7, wherein the executable instructions further classify one or more objects and features associated with the subsequent image during a visualization operation for capturing the subsequent image.

10. The system of claim 9, wherein the executable instructions further match the classification of the one or more objects and features for the subsequent image with the one or more personalized patterns whose confidence score surpasses the selected threshold.

11. The system of claim 7, wherein the executable instructions further apply the one or more personalized patterns of the settings of the image capturing device with existing automated settings of the image capturing device for capturing the subsequent image.

12. The system of claim 7, wherein the executable instructions further initiate a machine learning mechanism for learning the one or more personalized patterns of the settings of the image capturing device.

13. A computer program product for personalizing operations of an image capturing device by a processor, the computer program product comprising a non-transitory computer-readable storage medium having computer-readable program code portions stored therein, the computer-readable program code portions comprising:

an executable portion that classifies a combination of one or more objects and features along with associated settings of the image capturing device captured in an image;

an executable portion that determines one or more personalized patterns of the settings of the image capturing device according to the classifying, wherein the personalized patterns are indicative of user preferences learned according to historical images captured under a particular context;

an executable portion that assigns a confidence score to each of the one or more personalized patterns according to a strength of data used to generate the one or more personalized patterns;

an executable portion that, responsive to the image capturing device framing a preview of a subsequent image yet prior to a capture of the subsequent image, determines whether the preview is inclusive of image information related to the classifying; and an executable portion that, responsive to determining the image information is related to the classifying and the confidence score of the one or more personalized patterns surpasses a selected threshold, applies the one or more personalized patterns of the settings of the image capturing device for capturing a prior to capturing the subsequent image.

14. The computer program product of claim 13, further including an executable portion that ranks each of the one or more personalized patterns according to a frequency of occurrence in a plurality of images.

15. The computer program product of claim 13, further including an executable portion that:

classifies one or more objects and features associated with the subsequent image during a visualization operation for capturing the subsequent image; and matches the classification of the one or more objects and features for the subsequent image with the one or more personalized patterns whose confidence score surpasses the selected threshold.

16. The computer program product of claim 13, further including an executable portion that applies the one or more personalized patterns of the settings of the image capturing device with existing automated settings of the image capturing device for capturing the subsequent image.

17. The computer program product of claim 13, further including an executable portion that initiates a machine learning mechanism for learning the one or more personalized patterns of the settings of the image capturing device.

* * * * *